Jan. 16, 1962  R. E. FLETCHER  3,016,759
GEAR SHIFT LOCK
Filed Sept. 24, 1959

*INVENTOR.*
ROBERT E. FLETCHER
BY *Walter E. Pavlick*
ATTORNEY

United States Patent Office 3,016,759
Patented Jan. 16, 1962

3,016,759
GEAR SHIFT LOCK
Robert E. Fletcher, Toledo, Ohio, assignor to Dana Corporation, Toledo, Ohio, a corporation of Virginia
Filed Sept. 24, 1959, Ser. No. 842,132
16 Claims. (Cl. 74—475)

This invention relates to gear shifting mechanisms and more particularly to gear shifting mechanisms having releasable locking means.

Gear shifting mechanisms have many uses. One of such uses is in connection with a power take-off apparatus of the kind employed for attachment to the casing of a motor vehicle gear transmission. The shifting mechanism may incorporate a gear wheel which is axially shiftable along its supporting countershaft into one or another indexed position by an axially movable gear shifting rod and a lever actuatable to move the rod. A flexible cable is attached to the lever and operates the same upon appropriate pushing or pulling of the cable. In arrangements of this kind, it is desirable to require only a very light pressure on the flexible cable to effect shifting of the mechanism while still preventing shifting by means other than actuation of the flexible cable, such as forces present during the transfer of torque between the intermeshing gears.

Prior devices have either required a large actuating pressure on the flexible cable to effect shifting or else have required a light pressure and been subject to shifting caused by vibrations, bumps, etc.

It is an object of this invention to require only a very light pressure to operate a shifting mechanism, while at the same time preventing shifting without the initial movement being made by the operator.

In the preferred embodiment of this invention the gear shifting mechanism comprises a shifting rod having indexing means associated therewith. A shifting sleeve is disposed on the shifting rod and locking means prevents movement of the sleeve upon indexing of the indexing means. A lost motion connection is provided between the shifting rod and the shifting sleeve so that the shifting rod must first be moved from indexed position to release the locking means before shifting of the shifting sleeve can take place.

Figure 1:
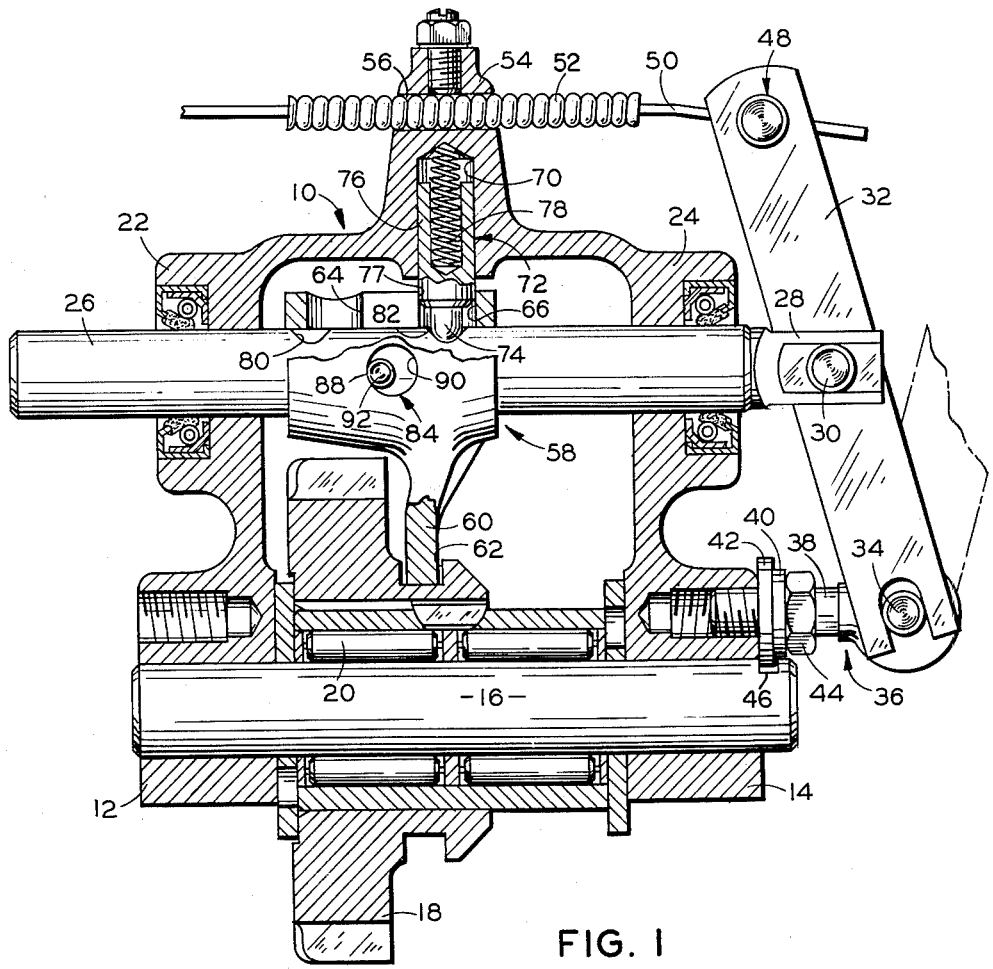
Figure 2:
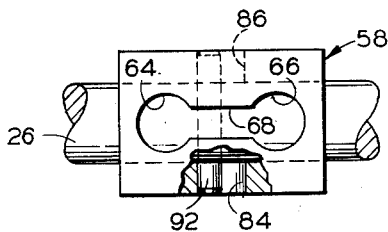

Other objects and advantages of this invention will become apparent from the following detailed description taken in connection with the accompanying drawings wherein:

FIG. 1 is a vertical sectional view of the gear shifting mechanism embodying this invention; and FIG. 2 is a plan view of a detail of this invention illustrated in FIG. 1.

Referring more particularly to the drawings, the gear shifting mechanism comprises a hollow casing 10 having a pair of axially aligned apertured bosses 12, 14 disposed adjacent the bottom thereof. A countershaft 16 has the ends thereof mounted in bosses 12, 14 and rotatably supports a spur gear wheel 18 by means of needle bearings 20. The spur gear wheel 18 is slidable along countershaft 16 to effect shiftitng thereof into or out of engagement with a drive gear provided in a transmission (not shown) and a driven gear on the output shaft of a power take-off (not shown).

Another pair of axially aligned apertured bosses 22, 24 are provided in the casing 10 adjacent the top thereof. A shifting rod 26 is positioned in parallel relationship to countershaft 16 and has the ends thereof slidably mounted in and extending through the apertures in bosses 22, 24. The end 28 of shifting rod 26 carries a pin 30 which rotatably mounts a lever 32 externally of casing 10. The lever 32 is rotatably mounted on pin 30 at its medial portion and the lower portion of lever 32 is bifurcated to receive a pin 34 which extends outwardly from a pivot assembly 36.

The pivot assembly 36 comprises a screw 38 threadedly received in the boss 14 adjacent countershaft 16. The screw 38 is provided with a washer 40 and a retaining ring 42 on the shank thereof. A nut 44 is also provided on the shank of screw 38 and is tightened to hold washer 40 and retaining ring 42 firmly against boss 14 of casing 10. The retaining ring 42 is larger in diameter than washer 40 and the periphery of the ring extends into a slot 46 provided in the end of countershaft 16 to lock the countershaft against axial movement.

The other end of lever 32 extends above the major portion of casing 10 and anchors a flexible wire 50 by means of an appropriate fastener 48. The wire 50 is provided with a protective flexible cable or sheath 52. A boss 54 extends upwardly from a central portion on the top of casing 10 and is provided with an aperture 56 which receives the wire 50 and its protective sheath 52 to guide reciprocal movement thereof.

It is apparent that the lever 32 constitutes the oscillatable lever of the shifting mechanism and by the oscillation of which, through appropriate pulling or pushing of the wire 50, the shifting rod 26 is moved bodily in one direction or the other within bosses 22, 24.

To effect shifting of the gear wheel 18 between engaged and disengaged position, a sleeve indicated generally at 58 is disposed on shifting rod 26 and has an arm 60 extending downwardly into an annular slot 62 provided in gear wheel 18.

The top portion of sleeve 58 is provided with a pair of circular apertures 64, 66 connected by a longitudinal slot or keyway 68. The boss 54 which extends outwardly from the top of casing 10 is provided with an internal bore 70 which slidably receives a poppet member 72. The poppet member 72 is provided with a nipple 74 on the end thereof and an enlarged portion 76 forming an abutment or locking shoulder 77. The enlarged portion 76 is bored to receive a loading spring 78 which is compressed between the poppet member 72 and the base of internal bore 70 of boss 54.

The shifting rod 26 is provided with a pair of longitudinally spaced notches which form indexing means 80 and 82. The nipple 74 on poppet member 72 slidably engages the top of shifting rod 26 and "snaps" into indexing notches 80 and 82 to clearly indicate the position of the shifting rod to the operator thereof. It should be particularly pointed out that the axial length of nipple 74 is slightly greater than the depth of apertures 64 and 66 so that when the nipple 74 engages the shifting rod 26 the locking shoulder 77 of the poppet member 58 lies above the sleeve 58. However, when the nipple 74 is in registry with indexing notches 80 and 82 the locking shoulder 77 of poppet member 72 lies within the apertures 64 and 66. It should also be noted that while the nipple 74 is free to slide in keyway 68, the diameter of the locking shoulder 77 is greater than the width of keyway or slot 68 thereby preventing movement of the sleeve 58 when the nipple 74 is in registry with indexing notches 80 or 82.

Means is provided for moving nipple 74 out of registry with notches 80 and 82 to remove the locking shoulder 77 from apertures 64 and 66. More particularly, a pair of diametrically opposed recesses 84, 86 are provided in the shifting sleeve 58 at angles of 90° from apertures 64 and 66. Recesses 84 and 86 are of circular configuration and define diametrically opposed abutment surfaces or walls 88 and 90. Abutment means taking the form of a pin 92 extends through the shifting rod 26 at right angles to the axis thereof. The pin 92 is fixedly secured to the shifting rod 26 and extends into recesses 84 and 86. Since the pin or abutment means 92 is smaller in diameter than recesses 84 and 86, limited relative movement is permitted between shifting rod 26 and sleeve 58 to provide a lost motion connection therebetween. The clearance between the abutment surfaces 88 and 90 of recesses 84, 86 is greater than the size of indexing notches 80 and 82 so that upon longitudinal movement of shifting rod 26 the nipple 74 will be moved out of registry with notches 80 or 82 before the pin 92 engages abutment surface 88 or 90 to effect shifting of the shifting sleeve. It will be apparent to those skilled in the art that many of the parts may be interchanged, for instance the pin 92 may be attached to the shifting sleeve 58 and the recesses 84 and 86 may be positioned on the shifting rod 26.

With the parts as shown in FIG. 1 the gear wheel 18 is in engagement with a drive gear of a transmission (not shown) and a driven gear on the output shaft of a power take-off (not shown). Movement of gear wheel 18 from this position is prevented without prior operation of the shifting rod 26 since the wall of aperture 66 in sleeve 58 will abut against locking shoulder 77 of poppet member 72 and prevent movement of the sleeve.

To move the gear wheel 18 out of driving engagement, wire 50 is pushed to pivot lever 32 to the position shown in dotted lines. This pivotal movement of lever 32 bodily moves shifting rod 26 to the right as viewed in FIG. 1. As the shifting rod 26 is moved to the right, nipple 74 is cammed out of registry with indexing notch 82 against the bias of loading spring 78. Since the nipple 74 is out of registry with indexing notch 82 the locking shoulder 77 is moved out of aperture 66 and nipple 74 is free to slide in slot 68. Simultaneously with this movement of poppet member 72, pin 92 on shifting rod 26 has moved from its extreme left position within recesses 84 and 86 into engagement with abutment surfaces 90 on the extreme right portion of the recesses. The shifting sleeve 58 then moves to the right with shifting rod 26 as nipple 74 slides freely in slot 68. The nipple 74 will slide along the shifting rod 26 until it overlies indexing notch 80 at which time it will "snap" into place and lock the gear wheel 18 is disengaged position. To return the gear wheel 18 into driving engagement with the transmission and power take-off the foregoing procedure is merely reversed.

Since the engagement of the locking shoulder 77 with the walls of apertures 64 and 66 positively locks the gear wheel 18 in indexed position unless shifting rod 26 is first operated, loading spring 78 supplies only a light pressure on the poppet member 72 to locate it in the indexing notches. Thus, only a light pressure need be applied to the wire 50 to effect shifting of the gear wheel.

While a single embodiment of this invention has been shown and described particularly in connection with power take-offs, it will be apparent to those skilled in the art that the device may be subjected to other uses and there may be many changes in structure as well as operation without departing from the scope of this invention as defined by the appended claims.

I claim:
1. In a gear shifting mechanism the combination comprising a shifting rod having indexing means associated therewith, a shifting sleeve disposed on said shifting rod, locking means preventing movement of said sleeve upon indexing of said indexing means, and means forming a lost motion connection between said shifting rod and said shifting sleeve whereby said shifting rod is moved from indexed position to release said locking means to effect shifting of the shifting sleeve.

2. In a gear shifting mechanism the combination comprising a shifting rod having indexing means associated therewith, a shifting sleeve disposed on said shifting rod and having a plurality of abutment surfaces, locking means preventing movement of said sleeve upon indexing of said indexing means, and abutment means carried by said shifting rod and being movable into engagement with one of said abutment surfaces thereby forming a lost motion connection with said shifting rod whereby said shifting rod is first moved from indexed position to release said locking means to effect shifitng of said shifting sleeve.

3. In a gear shifting mechanism the combination comprising a shifting rod having indexing means associated therewith, a shifting sleeve disposed on said said shifting rod and having at least one recess formed therein, locking means preventing movement of said sleeve upon indexing of said indexing means, and abutment means carried by said shifting rod and being movable in the recess of said sleeve to form a lost motion connection therewith whereby said shifting rod is first moved from indexed position to release said locking means to effect shifting of the shifting sleeve.

4. In a gear shifting mechanism the combination comprising a shifting rod having indexing means associated therewith, a shifting sleeve disposed on said shifting rod and having a pair of spaced abutment surfaces, locking means preventing movement of said sleeve upon indexing of said indexing means, and abutment means carried by said shifting rod and being movable between said abutment surfaces to form a lost motion connection with said shifting rod, said shifting rod being moved from indexed position to release said locking means during movement of said abutment means between said abutment surfaces.

5. In a gear shifting mechanism the combination comprising a shifting rod member having indexing means associated therewith, a shifting sleeve member disposed on said shifting rod member, locking means preventing movement of said sleeve member upon indexing of said indexing means, means forming a plurality of abutment surfaces on one of said members, and abutment means carried by the other of said members and being movable into engagement with said abutment surfaces thereby forming a lost motion connection between said members whereby said shifting rod member is first moved from indexed position to release said locking means to effect shifting of said shifting sleeve member.

6. In a gear shifting mechanism the combination comprising a shifting rod having spaced notches disposed therein, a poppet member adapted to be biased into engagement with said notches, a shifting sleeve disposed on said shifting rod, locking means preventing movement of said sleeve upon seating of said poppet member in one of said notches, and means forming a lost motion connection between said shifting rod and said shifting sleeve whereby said shifting rod is moved to disengage said poppet member from said notch to release said locking means prior to shifting of said sleeve.

7. In a gear shifting mechanism the combination comprising a shifting rod having spaced notches therein, a poppet member biased into engagement with one of said notches to effect indexing of said shifting rod, a shifting sleeve disposed on said shifting rod and having a pair of spaced abutment surfaces, locking means preventing movement of said sleeve upon indexing of said shifting rod, and abutment means carried by said shifting rod and being movable between said abutment surfaces thereby forming a lost motion connection with said shifting rod, said shifting rod being moved from indexed position to release said locking means during movement of said abutment means between said spaced abutment surfaces.

8. In a gear shifting mechanism the combination comprising a shifting rod having a pair of spaced notches therein, a shifting sleeve disposed on said shifting rod and having a pair of spaced apertures connected by a slot, a poppet member slidable in said slot and adapted to be seated in said notches for indexing said shifting rod, a locking portion on said poppet member preventing slidable movement of said poppet member in said slot when said poppet member is in engagement with said notches, and means forming a lost motion connection between said shifting rod and said shifting sleeve whereby said shifting rod is moved from indexed position to permit slidable movement of said poppet member in said slot thereby effecting shifting of said shifting sleeve.

9. In a gear shifting mechanism the combination comprising a shifting rod having a pair of spaced notches disposed therein, a shifting sleeve disposed on said shifting rod and having a pair of spaced apertures connected by a slot, a poppet member slidable in said slot and adapted to be seated in said notches upon registry with said apertures for indexing said shifting rod, an enlarged portion on said poppet member preventing slidable movement of said poppet in said slot upon seating of said poppet in said notches, a pair of spaced abutment surfaces on said sleeve, and abutment means carried by said shifting rod and movable between said spaced abutment surfaces thereby forming a lost motion connection with said shifting rod, said shifting rod being movable from indexed position during movement of said abutment means between said abutment surfaces thereby permitting slidable movement of said poppet in said slot to effect shifting of said shifting sleeve.

10. In a gear shifting mechanism the combination comprising a shifting rod having a pair of spaced notches disposed therein, a shifting sleeve disposed on said shifting rod and having a pair of spaced apertures connected by a slot, a poppet member slidable in said slot and adapted to be seated in said notches for indexing said shifting rod, locking means on said poppet member preventing slidable movement of said poppet in said slot upon seating of said poppet in said notches, means forming at least one recess in said shifting sleeve, and a pin carried by said shifting rod and movable between the opposed walls of said recess thereby forming a lost motion connection with said shifting rod, the clearance between the opposed recess walls being greater than the size of said notches whereby said shifting rod is first moved from indexed position to permit slidable movement of said poppet member in said slot and corresponding shifting of said shifting sleeve.

11. In a gear shifting mechanism the combination comprising a shifting rod member having a pair of spaced notches disposed therein, a shifting sleeve member disposed on said shifting rod member and having a pair of spaced apertures connected by a slot, a poppet slidable in said slot and adapted to be seated in said notches upon registry with said apertures for indexing said shifting rod member, locking means upon said poppet preventing slidable movement of said poppet in said slot upon seating of said poppet in said notch, means forming at least one recess in one of said members, and a pin carried by the other of said members and movable between the opposed walls of said recess thereby forming a lost motion connection between said members, the clearance between the opposed recess walls being greater than the size of said notch whereby said shifting rod member is first moved from indexed position to permit slidable movement of said poppet in said slot and corresponding shifting of said shifting sleeve member.

12. In a gear shifting mechanism the combination comprising a casing, an axially movable shift rod mounted in said casing and having a plurality of axially spaced notches, a shifting sleeve disposed on said shifting rod and having a pair of spaced apertures connected by a slot, a poppet member slidable in said slot and adapted to be seated in one of said notches upon registry with one of said apertures for indexing said shifting rod, said poppet member having a portion thereon larger than said slot for preventing slidable movement of said poppet in said slot upon seating of said poppet in one of said notches, means forming at least one recess in said sleeve having opposed walls defining a pair of spaced abutment surfaces, and abutment means carried by said shifting rod and movable between said spaced abutment surfaces thereby forming a lost motion connection with said shifting rod, the clearance between said abutment surfaces being greater than the size of said notches whereby said shifting rod is moved from indexed position during movement of said abutment means between said abutment surfaces thereby permitting slidable movement of said poppet in said slot to effect shifting of said shifting sleeve.

13. In a control device the combination comprising a first member having indexing means associated therewith, a second member operatively connected to said first member, locking means associated with said indexing means preventing movement of said second member upon indexing of said first member, and means forming a lost motion connection between said first and second members whereby said first member is moved from indexed position to rlease said locking means to effect movement of said second member.

14. In a gear shifting mechanism the combination comprising a shifting rod having indexing means associated therewith, a shifting member operatively connected to said shifting rod, locking means preventing movement of said shifting member upon indexing of said indexing means, and means forming a lost motion connection between said shifting rod and said shifting member whereby said shifting rod is moved from indexed position to release said locking means before effecting shifting of said shifting member.

15. In a control device the combination comprising a first member, a second member operatively connected to said first member, detent means mounted independently of said first and second members and operable to index said first member, locking means preventing movement of said second member upon indexing of said first member, and means forming a lost motion connection between said first and second members whereby said first member is moved from indexed position to release said locking means to permit movement of said second member.

16. In a control device the combination comprising a first member having indexing means associated therewith, a second member operatively connected to said first member, locking means provided by said indexing means and said second member preventing movement of said second member upon indexing of said first member, and means forming a lost motion connection betwen said first and second members whereby said first member is moved from indexed position to release said locking means to effect movement of said second member.

References Cited in the file of this patent

UNITED STATES PATENTS

| | | |
|---|---|---|
| 1,831,194 | Radford | Nov. 10, 1931 |
| 2,402,842 | Rhodes | June 25, 1946 |

FOREIGN PATENTS

| | | |
|---|---|---|
| 368,317 | Italy | Feb. 13, 1939 |